United States Patent
Gersbach et al.

(10) Patent No.: US 8,596,346 B2
(45) Date of Patent: Dec. 3, 2013

(54) COAL FINES FLOCCULATION FROM PRODUCED WATER USING OIL-SOLUBLE PHOSPHATE ESTER

(75) Inventors: Matthew Gersbach, Grand Prairie (CA); Glen Clifford Fyten, Red Deer (CA)

(73) Assignee: Halliburton Energy Services, Inc., Houston, TX (US)

( * ) Notice: Subject to any disclaimer, the term of this patent is extended or adjusted under 35 U.S.C. 154(b) by 432 days.

(21) Appl. No.: 12/917,808

(22) Filed: Nov. 2, 2010

(65) Prior Publication Data

US 2012/0103613 A1 May 3, 2012

(51) Int. Cl.
*E21B 43/00* (2006.01)
*E21B 19/00* (2006.01)
*C02F 1/00* (2006.01)
*B01D 17/04* (2006.01)
*B01D 21/01* (2006.01)

(52) U.S. Cl.
USPC .... 166/90.1; 166/75.11; 166/369; 166/305.1; 210/723; 210/728; 210/729; 210/708; 210/710; 210/712

(58) Field of Classification Search
None
See application file for complete search history.

(56) References Cited

U.S. PATENT DOCUMENTS

| | | | |
|---|---|---|---|
| 3,485,752 A * | 12/1969 | Eck et al. ............... | 210/734 |
| 3,757,864 A | 9/1973 | Crawford et al. | |
| 4,007,128 A | 2/1977 | Poklacki | |
| 4,200,539 A | 4/1980 | Burnham et al. | |
| 4,331,447 A | 5/1982 | Kamada et al. | |
| 4,756,823 A * | 7/1988 | O'Neill et al. ........... | 209/166 |
| 4,866,856 A | 9/1989 | Feeley | |
| 4,906,386 A | 3/1990 | Vasconcellos et al. | |
| 5,183,575 A | 2/1993 | Vasconcellos et al. | |
| 5,202,035 A | 4/1993 | Huddleston et al. | |
| 5,484,903 A | 1/1996 | Szablikowski et al. | |
| 5,649,596 A | 7/1997 | Jones et al. | |
| 6,799,682 B1 * | 10/2004 | Yoon .................... | 209/166 |
| 6,871,743 B2 | 3/2005 | Yoon | |
| 7,204,311 B2 | 4/2007 | Welton et al. | |
| 7,690,431 B2 | 4/2010 | Nguyen et al. | |
| 7,703,520 B2 | 4/2010 | Dusterhoft | |
| 2008/0053914 A1 | 3/2008 | Yoon | |
| 2010/0218946 A1* | 9/2010 | Symington et al. ........ | 166/272.6 |

FOREIGN PATENT DOCUMENTS

WO PCT/GB2011/004554     2/2012

* cited by examiner

*Primary Examiner* — Angela M DiTrani
(74) *Attorney, Agent, or Firm* — Craig W. Roddy; Booth Albanesi Schroeder LLC

(57) ABSTRACT

A method of flocculating coal fines from produced water that includes the steps of: (A) mixing at least: (i) produced water, wherein the produced water comprises suspended coal fines; (ii) one or more oil-soluble phosphate esters; and (iii) water-immiscible solvent; wherein the mixing is in proportions to obtain an oil-in-water emulsion; (B) allowing or mechanically causing the oil-in-water emulsion to substantially break into: (i) a first fluid having a continuous phase comprising at least some of the water from the produced water; and (ii) a second fluid having a continuous phase comprising at least some of the water-immiscible solvent; and (C) mechanically separating the first fluid and the second fluid. Optionally, the step of mixing further includes mixing with a crosslinker for the one or more phosphate esters to form a gel for suspending the separated coal fines.

20 Claims, No Drawings

COAL FINES FLOCCULATION FROM PRODUCED WATER USING OIL-SOLUBLE PHOSPHATE ESTER

BACKGROUND

1. Technical Field

The inventions generally relate to producing crude oil or natural gas from a well drilled into a subterranean formation. More particularly, the invention is directed to methods of separating coal fines from produced water, which can include water from a drilling fluid, a treatment fluid, or naturally occurring oilfield water.

2. Background Art

Producing Oil & Gas

Petroleum is a complex mixture of naturally-occurring hydrocarbon compounds found in the rock of certain subterranean formations. As used herein, a "hydrocarbon compound" or simply "hydrocarbon" broadly refers to an organic compound comprising hydrogen and carbon. As used herein, a "hydrocarbon" does not necessarily consist entirely of hydrogen and carbon and it is not necessarily a naturally occurring compound but can be synthetic. A hydrocarbon compound can be as simple as the methane ($CH_4$) molecule or can be a highly complex molecule or anything in between. For example, a hydrocarbon molecule can have the shape of a chain, a branched chain, a ring, or a more complex structure. Depending on the chemical formula and structure, a hydrocarbon compound is a gas, liquid, or solid at room temperature and 1 atmosphere pressure.

In general, an "organic compound" is a chemical compound containing a carbon-hydrogen bond (C—H), but a compound containing a carbon-halide bond (C—X) is also considered to be an organic compound (e.g., "organohalides"). Thus, the term "organic compound" or "organic" includes a "hydrocarbon compound" but is broader than "hydrocarbon."

Depending on the composition of the petroleum, it is a gas, liquid, or solid (when at room temperature and 1 atmosphere pressure), but the term is generally used to refer to liquid crude oil. In the context of producing petroleum from a well, "oil" and "gas" refers to crude oil and natural gas. Impurities such as sulfur, oxygen, and nitrogen are common in petroleum. There is considerable variation in color, specific gravity, odor, sulfur content, and fluid viscosity in petroleum from different areas.

A subterranean formation containing oil, gas, or both is sometimes referred to as a reservoir. A reservoir is in a shape that will trap hydrocarbons and that is covered by an impermeable or sealing rock. A reservoir may be located under land or under the seabed off shore. Oil and gas reservoirs are typically located in the range of a few hundred feet (shallow reservoirs) to a few tens of thousands of feet (ultra-deep reservoirs) below the surface of the land or seabed.

As used herein, "subterranean formation" refers to the fundamental unit of lithostratigraphy. A subterranean formation is a body of rock that is sufficiently distinctive and continuous that it can be mapped. In the context of formation evaluation, the term refers to the volume of rock seen by a measurement made through the wellbore, as in a log or a well test. These measurements indicate the physical properties of this volume, such as the property of permeability. A "zone" refers to an interval or unit of rock along a wellbore that is differentiated from surrounding rocks based on petroleum content or other features, such as faults or fractures. A "zone" can be, for example, a portion of a subterranean formation along a wellbore that has been fractured, acidized, or otherwise treated.

To produce oil or gas from a reservoir, a wellbore is drilled into a subterranean formation, which may be a reservoir or adjacent to a reservoir. The "wellbore" refers to the drilled hole, including the openhole or uncased portion of the well. As used herein, the "borehole" refers to the inside diameter of the wellbore wall, that is, the rock face or wall that bounds the drilled hole. A wellbore can have vertical and horizontal portions, and it can be straight, curved, or branched. The wellhead is the surface termination of a wellbore. As used herein, "uphole" and "downhole" are relative to the wellhead, regardless of whether a wellbore portion is vertical or horizontal.

As used herein, a "well" includes at least one wellbore. A "well" can include a near-wellbore region of a subterranean formation surrounding a portion of a wellbore that is in fluid communication with the wellbore. As used herein, "into a well" means at least through the wellhead. It can include into any downhole portion of the wellbore or through the wellbore and into a near-wellbore region.

Oil wells usually produce some gas and usually produce some water, too. Most oil wells eventually produce mostly gas or water.

Well Services and Well Fluids

Generally, well services include a wide variety of subterranean operations that may be performed in oil, gas, geothermal, or water wells, such as drilling, completion, and workover. "Drilling" refers to the events and equipment necessary for drilling a wellbore. "Completion" refers to the events and equipment necessary to bring a wellbore into production once drilling operations have been concluded, including but not limited to the assembly of downhole tubulars and equipment required to enable safe and efficient production from an oil or gas well. "Workover" refers to the performance of major maintenance or remedial treatments on an oil or gas well.

Completion and workover operations may include, but are not limited to, cementing, gravel packing, stimulation, and conformance operations. Many of these well services are designed to facilitate or enhance the production of desirable fluids from or through a subterranean formation.

As used herein, the word "treatment" refers to a treatment for a well or subterranean formation penetrated by a wellbore that is adapted to achieve a specific purpose in completion or workover, such as stimulation, isolation, or conformance control; however, the word "treatment" does not necessarily imply any particular purpose.

Drilling requires the use of a drilling fluid. As used herein, a "drilling fluid" is any of a number of fluids, including fluid mixtures of a liquid with particulate solids or gas (such as suspensions, emulsions, foams) used in operations to drill boreholes into the earth. The term is synonymous with "drilling mud" in general usage, although sometimes the term is used to refer to more sophisticated and well-defined "muds." One classification scheme for drilling fluids is based on singling out the component that clearly defines the function and performance of the fluid: (1) water-based, (2) non-water-based, and (3) gaseous (pneumatic). Each category has a variety of subcategories that overlap each other considerably.

A treatment typically involves introducing a treatment fluid into a well. As used herein, a "treatment fluid" is a fluid used to resolve a specific condition of a wellbore or subterranean formation. As used herein, a "treatment fluid" also means the specific composition of a fluid at the time the fluid is being introduced into a wellbore. A treatment fluid is typically adapted to be used to achieve a specific purpose, such as stimulation, isolation, or control of reservoir gas or water. The word "treatment" in the term "treatment fluid" does not necessarily imply any particular action by the fluid.

A "spacer fluid" is a fluid used to physically separate one special-purpose fluid from another. A special-purpose fluid can be a drilling fluid, a cementing fluid, or a treatment fluid. Special-purpose fluids are typically prone to contamination, so a spacer fluid compatible with each is used between the two. For example, a spacer fluid is used when changing fluid types used in a well. For example, a spacer fluid is used to change from a drilling fluid during drilling a well to a cement slurry during cementing operations in the well. In case of an oil-based drilling fluid, it should be kept separate from a water-based cementing fluid. In changing to the latter operation, a chemically treated water-based spacer fluid is usually used to separate the drilling fluid from the cement slurry. By way of another example, a spacer fluid can be used to separate two different types of treatment fluids.

As used herein, a "well fluid" refers to any fluid adapted to be used in a well for a particular purpose, without necessarily implying any particular purpose. A "well fluid" can be, for example, a drilling fluid, a cementing fluid, a treatment fluid, or a spacer fluid. As used herein, a "well fluid" means the specific composition of a fluid at the time the fluid is being introduced into a wellbore.

Produced Water

As used herein, "produced water" is water that is produced from or through a wellbore of a well through the wellhead to the surface. Produced water has a continuous phase of water or an aqueous solution. Produced water can include water from a previously introduced well fluid, such as a drilling fluid or a treatment fluid, or water naturally occurring in a subterranean formation. The term often implies an inexactly known or unknown composition. Produced water can include, for example, coal fines, other suspended solids, dissolved inorganic ions, crude oil, or a chemical of a previously introduced well fluid.

Produced water can be characterized is many different ways. Some of the more basic characterizations include, for example, pH, concentration of total suspended solids ("TSS"), concentration of particular types of solids such as coal fines, concentration of total dissolved solids ("TDS"), concentration particular dissolved ions, electrical conductivity, turbidity, and extractable organic compounds such as from crude oil or from a previously introduced well fluid.

The characteristics of produced water can vary widely from one oilfield to another, from one well to another within an oilfield, and over the time of production,. Produced water may have, for example, pH in the range of about 5 to about 9, very high TSS, very high TDS, very high electrical conductivity, very high turbidity, and some extractable organic liquids, usually petroleum.

Problem of Coal Fines in Produced Water

Coal fines are sometimes found in produced water. The coal fines can be naturally occurring in a subterranean formation or they can be created during a drilling operation that penetrates into a coal-bearing formation. The coal fines can be produced with the produced water by the flow of fluid from a subterranean formation or with a returned drilling fluid.

The coal fines prevent the reuse of the produced water because it is undesirable to re-introduce coal fines into the well. Removal of the coal fines would allow the reuse of produced water without the re-introduction of the fines into the wellbore where they can plug pore throats, such as the cleat structure of a coal formation, which would adversely affect production. Removal of the coal fines would also aid in the reduction of wear on surface pumps used in a re-use of the produced water as there would be reduced friction with the absence of solids fed through the pump when fluid is fed down hole.

In addition, a coal flocculation process to remove coal fines preferably should not use a flocculation or coagulation polymer because residual polymer in the treated produced water should not be introduced into a subterranean formation. The use of prior coal fines flocculation technology would inevitably result in the potential for overtreatment with either flocculant or coagulant and recirculation of the overtreatment back into the reservoir. Further, prior flocculation technology requires large proportions of treatment chemicals.

SUMMARY OF THE INVENTION

According to the invention, a method of flocculating coal fines from produced water is provided, the method comprising the steps of:
(A) mixing at least:
    (i) produced water, wherein the produced water comprises suspended coal fines;
    (ii) one or more oil-soluble phosphate esters; and
    (iii) water-immiscible solvent;
in proportions to obtain an oil-in-water emulsion;
(B) causing the oil-in-water emulsion to substantially break into:
    (i) a first fluid having a continuous phase comprising the water from the produced water; and
    (ii) a second fluid having a continuous phase comprising the water-immiscible solvent; and
(C) mechanically separating the first fluid and the second fluid.

In an embodiment, an oil-wetting surfactant (preferably, one or more oil-soluble phosphate esters) is used to separate to the top of the produced water finely dispersed coal fines from produced water. The coal fines can then be separated or skimmed off the top of the produced water. The produced water can then be re-injected for continual use in drilling into formation or used for other applications.

Further to separating the coal fines from produced water, a crosslinker for the oil-wetting surfactant can optionally be added to gel/crosslink the coal fines and surfactant (which is preferably in a solvent carrier) to allow for easier removal of the coil fines from the produced water.

As will be appreciated by a person of skill in the art, the methods according to the invention have application in various kinds operations involved in the production of oil and gas from a well.

The features and advantages of the present invention will be apparent to those skilled in the art. While numerous changes may be made by those skilled in the art, such changes are within the spirit of the invention.

DETAILED DESCRIPTION OF PRESENTLY PREFERRED EMBODIMENTS AND BEST MODE

General Definitions and Usages

As used herein, the words "comprise," "have," "include," and all grammatical variations thereof are each intended to have an open, non-limiting meaning that does not exclude additional elements or steps.

As used herein, a material is considered to be "soluble" in a liquid if at least 10 grams of the material can be dissolved in one liter of the liquid when tested at 77° F. and 1 atmosphere pressure and considered to be "insoluble" if less than that. As used herein, "water soluble" means soluble when tested in deionized tap (potable) water. As used herein, "oil soluble" means soluble when tested in n-hexane.

Unless otherwise specified, any ratio or percentage means by volume.

As used herein, the phrase "by weight of the water" means the weight of the water of the continuous phase of the fluid as a whole without the weight of any suspended solids, proppant, viscosity-increasing agent, dissolved salt, or other materials or additives that may be present in the water.

Unless otherwise specified, any doubt regarding whether units are in U.S. or Imperial units, where there is any difference U.S. units are intended herein. For example, "gal/Mgal" means U.S. gallons per thousand U.S. gallons.

Fluid or Gel (Physical State)

As used herein, a "fluid" refers to an amorphous substance that tends to flow and to conform to the outline of its container when tested at a temperature of 77° F. (25° C.) and a pressure of 1 atmosphere. The viscosity of a fluid is the resistance of the fluid to flow, defined as the ratio of shear stress to shear rate. The viscosity of a fluid is usually expressed in units of centipoise ("cP"). Viscosity must have a stated or an understood shear rate and measurement temperature in order to be meaningful. As used herein, if not otherwise specifically stated, the viscosity of a fluid is measured with a Fann Model 50 type viscometer at a shear rate of 40 l/s and at 77° F. (25° C.) and a pressure of 1 atmosphere. For reference, the viscosity of pure water is about 1 cP. As used herein, a material is considered to be a fluid if it has a viscosity of less than 5,000 cP.

Examples of fluids are liquids and gases. As used herein, a "liquid" refers to an amorphous substance that has little or no tendency to disperse and relatively high incompressibility when tested at a temperature of 77° F. (25° C.) and a pressure of 1 atmosphere. In contrast, a gas refers to an amorphous substance that has a tendency to disperse and high compressibility when tested at a temperature of 77° F. (25° C.) and a pressure of 1 atmosphere.

A substance, such as a fluid, can be homogeneous or heterogeneous. As used herein, a homogeneous substance is a substance that appears to be uniform when viewed with a microscope. A heterogeneous substance appears to not be uniform when viewed with a microscope.

A homogeneous fluid consists of a single fluid phase with uniform properties throughout. Examples of a homogeneous fluid include water, crude oil, or a solution of one or more dissolved chemicals. An aqueous solution is a solution in which water is the solvent.

A heterogeneous fluid consists of at least one fluid phase and at least one other phase, which can be, for example, an immiscible fluid or an insoluble particulate. An example of a heterogeneous fluid is a dispersion. A dispersion is system in which one phase is dispersed in another phase. A dispersion can be, for example, a suspension of solid particles in an external liquid phase or a slurry, which is a relatively thick suspension of solid particles in an external liquid phase. Further, a dispersion can be a foam, which is a liquid that includes a dispersion of undissolved gas bubbles that foams the fluid through the use of a chemical (a foaming agent) to achieve stability.

Another example of a dispersion is an emulsion, which is a dispersion of an immiscible liquid droplets into an external liquid phase. An emulsion can be unstable or stable. A chemical (an emulsifier or emulsifying agent) can be used to reduce the interfacial tension between the two immiscible liquids to improve or achieve stability. An emulsion can be an oil-in-water (o/w) type or water-in-oil (w/o) type. A water-in-oil emulsion is sometimes referred to as an invert emulsion. In the context of a describing the liquid phases of an emulsion, "water" refers to water or an aqueous solution, and "oil" refers to any organic liquid that is immiscible with water, such as crude oil, diesel, mineral oil, kerosene, xylene, or synthetic oil.

It should be understood that multiple or nested emulsions are possible. Multiple emulsions are complex polydispersed systems where both oil-in-water and water-in-oil emulsions exist simultaneously in the fluid, where the oil-in-water emulsion is stabilized by a lipophilic surfactant and the water-in-oil emulsion is stabilized by a hydrophilic surfactant. These include water-in-oil-in-water (w/o/w) and oil-in-water-in-oil (o/w/o) type multiple emulsions. Even more complex polydispersed systems are possible. Multiple emulsions are can be formed, for example, by dispersing a water-in-oil emulsion in water or an aqueous solution, or by dispersing an oil-in-water emulsion in oil.

The continuous phase of a fluid as a whole is the most external phase of the fluid, regardless of the number of phases. As used herein in the context of describing the phase or phases of a fluid, a "water-based fluid" means that water or an aqueous solution is the continuous phase of the fluid as a whole, which may or may not have any other phases. In contrast, an "oil-based fluid" means that oil is the continuous phase of the fluid as a whole, which may or may not have any other phases.

The term "gel," as used herein, and its derivatives refers to a semi-solid, jelly-like state, which is assumed by some colloidal dispersions. A drilling or treatment fluid can be viscous. In some applications, the fluid forms or becomes a gel downhole. Liquid droplets or solid particulate can be dispersed in a gel. The dispersed liquid droplets in a gel can be, for example, of an emulsion.

Step of Mixing

The step of mixing includes mixing at least: (i) produced water, wherein the produced water comprises suspended coal fines; (ii) one or more oil-soluble phosphate esters; and (iii) water-immiscible solvent. These are mixed in proportions to obtain an oil-in-water emulsion. Preferably, the oil-in-water emulsion is unstable, as will hereinafter be discussed in more detail.

Produced Water with Coal Fines

As discussed above, produced water sometimes includes coal fines, which is sometimes referred to as "coal water." The amount of coal fines in produced water can vary greatly. Even a small concentration of coal fines in produced water can be problem for reuse of the produced water in a well, but sometimes the produced water can contain large amounts of coal fines. For example, some produced water has coal fines as high as about 10% by weight of the produced water.

Preferably, the produced water comprises at least 10 g/m$^3$ suspended coal fines.

Preferably, at least 90% of the coal fines in the produced water have a particle size distribution in the range of about 0.1 micrometer to about 500 micrometer. More preferably, the coal fines in the produced water have a particle size distribution in the range of about 0.3 micrometer to about 200 micrometer.

Preferably, a solvent-washed, dried sample of the total suspended solids in the produced water has a specific gravity of less than 2. This indicates the total suspended solids are primarily of organic compounds, and more particularly, primarily coal fines. This is in comparison to a solvent-washed, dried sample of suspended solids consisting essentially of rock fragments or clay particulate, which would be expected to have a specific gravity of greater than 2.

Oil-Soluble Phosphate Esters

Phosphate esters have the general formula: $P(=O)(OH)(OR)(OR^1)$ wherein R and $R^1$ may comprise a linear or branched hydrocarbon group that, for example, may comprise a linear or branched alkyl, alkenyl, aryl, alkylaryl, arylalkyl, cycloalkyl, alkyl ether, aryl ether, alkyl aryl ether, or a mixture thereof.

The linear or branched hydrocarbon groups used herein are not limited in size and may comprise any number of carbon atoms and/or other atoms or groups, provided that the phosphate ester is oil soluble. Preferably, the hydrocarbon groups have in the range of about 2 to about 30 carbons. More preferably, the one or more oil-soluble phosphate esters have ester functionalities comprising at least 4 carbons.

In certain embodiments, it is believed the phosphate ester in the present invention can comprise the reaction product of a pentavalent phosphorus compound and an alcohol, and their preparation is according to well-known synthesis procedures (see, for example, U.S. Pat. Nos. 3,757,864, 4,007,128, and 4,200,539, all of which are incorporated herein by reference). Optionally, the phosphate esters may comprise the reaction product of 1) pentavalent phosphorus (e.g., $P_2O_5$) reacted with a trialkylphosphate, and 2) an alcohol. The synthesis of these phosphate esters takes place according to well-known procedure, for example, as set forth in U.S. Pat. No. 5,202,035 (incorporated herein by reference). Alternatively, the phosphate esters useful in the present invention can be prepared by transesterification of orthophosphate ester with triethyl phosphate, for example, U.S. Pat. No. 5,649,596 (incorporated herein by reference).

For example, a mixture of oil-soluble phosphate esters can be made by a reaction triethyl phosphate with C8-C10 linear alcohols and phosphorous pentoxide. This results in a mixture of primarily di-ester structures of varying molecular weight.

An oil-soluble phosphate ester that is suitable for use in the present invention is MO-85M™ commercially available from Halliburton Energy Services in Duncan, Okla., USA.

Using one or more oil-soluble phosphate esters, the need for using long-chain polymers as flocculant for coal fines is reduced or eliminated, and the risk of re-introducing such long-chain polymers back into the reservoir are also reduced or eliminated.

Water-Immiscible Solvent

In general, a "solvent" means a material that dissolves another solid, liquid, or gaseous solute, resulting in a homogeneous solution.

As used herein, a solvent can be one or more chemical compounds. For example, a solvent can be n-hexane, which is a single chemical compound, or kerosene, which is a mixture of hydrocarbons refined from petroleum.

In an industrial context, although not necessarily required by the definition, a "solvent" suggests or implies a material that is readily available in bulk quantities at relatively low cost. As used herein, "readily available" means being commercially available in industrial supply markets without requiring advance ordering for special chemical processing or manufacturing. As used herein, "bulk" quantities means available in truck-load quantities of at least 5,000 US gallons (even if not necessarily used in such quantities for the purposes of the present invention). As used herein, "relatively low cost" means less than about 5 times the cost of crude oil in bulk quantities.

As used herein, a "water-immiscible solvent" means a solvent that is a liquid (at 77° F. and 1 atmosphere) and not miscible with water.

Selection Characteristics for the Water-Immiscible Solvent

For the purposes of the present invention, a water-immiscible solvent is selected that is not an oil-soluble phosphate ester. In addition, the water-immiscible solvent is selected for being capable of dissolving at least 10 $l/m^3$ of the oil-soluble phosphate ester used in the invention. Moreover, the water-immiscible solvent is selected for the characteristic of not being chemically reactive with the oil-soluble phosphate ester under the conditions of the step of mixing with the produced water and the oil-soluble phosphate ester.

According to the present invention, the water-immiscible solvent is preferably selected for being readily available in bulk quantities at relatively low cost. More preferably, it is selected for being readily available in bulk quantities for less than about 5 times the cost of crude oil in bulk quantities.

Preferably, the water-immiscible solvent for use in the present invention is selected for having one or more of the following characteristics:

(a) insoluble in water (that is, less than 10 $l/m^3$ will dissolve in water);
(b) non-polar (that is, having a dielectric constant of less than 15);
(c) Snyder polarity index of less than 5;
(d) specific gravity less than water (that is, a density of less than about 1 g/ml at 77° F. and 1 atmosphere);
(e) closed-cup flash point of at least 73° F., that is, it may be flammable, but is considered to be not "very flammable";
(f) chemical reactivity considered to be normally stable, for these purposes, for example, stable to heating up to at least 100° F. (more preferably at least 150° F.), and not affected by aqueous solutions of acids, alkalis, most oxidizing agents, and most reducing agents;
(g) National Fire Protection Association ("NFPA") health hazard rating of 2 ("hazardous") or lower; and
(h) considered to be "readily biodegradable" using at least one of the tests commonly used in the US oil and gas industry.

Preferred Examples for the Water-Immiscible Solvent

If the water-immiscible solvent has a lower specific gravity than water, it can provide the ability to float the fines to the surface as the oil-in-water emulsion separates. It is preferably to float the coal than sink it to allow for more efficient removal of the coal fines by skimming. Floating of the coal fines allows for removal without either draining a holding tank or using a more complicated bottom auger system. With floatation, the skimming process reduces the need for large quantities of fresh water to replace that extracted from the system with floc removal.

According to the principles of the present invention, preferably, the water-immiscible solvent comprises one or more hydrocarbon compounds. A presently preferred embodiment for the water-immiscible solvent is Drakeol® white mineral oil, which is commercially available from Penreco in Pennsylvania, USA.

Mixing Proportions for the Oil-in-Water Emulsion

Preferably, the oil-in-water emulsion comprises: (i) the produced water; (ii) the phosphate esters in a proportion of at least 0.1 $l/m^3$ of the produced water; and (iii) the water-immiscible solvent, wherein the water-immiscible solvent is: (a) in a proportion of at least 1 $l/m^3$ to the produced water; and (b) in a proportion of at least 3:1 by volume of the oil-soluble phosphate esters.

Preferred Proportions of Phosphate Esters

More preferably, the one or more phosphate esters are in a proportion of at least 0.1 $l/m^3$ produced water. More preferably, the phosphate esters are in a proportion in the range of about 0.5 $l/m^3$ to about 10 $l/m^3$ of the produced water. Although over treating is not expected to be a physical problem, most preferably the phosphate esters are in a proportion of less than 5 l/m³ of the produced water for cost reasons.

Preferred Proportions of Water-Immiscible Solvent

Preferably, the water-immiscible solvent is greater than 1 l/m³ of the produced water. More preferably, the water-immiscible solvent is in the range of about 3 l/m³ to about 100 l/m³ of the produced water.

Preferably, water-immiscible solvent is a proportion of at least 5 to 1 of the one or more oil-soluble phosphate esters. More preferably, the water-immiscible solvent is a proportion in the range of at least 5 to 1 to at most 50 to 1 of the one or more oil-soluble phosphate esters.

Although over treating with water-immiscible solvent is not expected to be a physical problem, the upper limits for the water-immiscible solvent are primarily for cost reasons as overtreatment would be wasteful.

Oil-in-Water Emulsion is Preferably Highly Unstable

Preferably, the proportions of the produced water, the oil-soluble phosphate esters, and the water-immiscible solvent are selected to produce an oil-in-water emulsion that is unstable to the extent of substantially breaking in less than 5 minutes after the step of mixing upon standing at 77° F. and 1 atmosphere pressure. More preferably, it is unstable to the extent of substantially breaking in less than 1 minute. It is to be understood that this instability of the emulsion would be tested on a laboratory scale of about 0.5 to about 1 liter and that in the field large quantities of fluid may be expected to take longer to substantially break. Nevertheless, the invention is expected to provide substantial improvements for the separation time in the field.

Step of Mixing-Conditions

Preferably, the step of mixing comprises: mixing under a shear rate and for a time that is at least sufficient to create an unstable emulsion.

Step of Allowing or Causing the Substantial Break of Oil-in-Water Emulsion

As used herein, to "substantially break" an oil-in-water emulsion means that at least 80% by volume of the oil phase and at least 80% by volume of the water phase of the oil-in-water emulsion separate into distinct oil and water layers.

Preferably, the step of allowing or causing to break comprises: allowing the oil-in-water emulsion to stand before the step of mechanically separating. It should be understood that to "stand" means to be left undisturbed under ambient conditions at the well site.

If an emulsifier is used for any reason, or if the emulsion is undesirably stable, the step of allowing or causing the break can include adding a chemical to destabilize the emulsion.

Step of Mechanically Separating

Preferably, the step of mechanically separating comprises: skimming. More preferably, where the second fluid comprising the continuous water phase would typically have a higher density than the first fluid comprising the continuous oil phase, the step of skimming comprises skimming the second fluid from the top of the first fluid.

The step of mechanically separating can comprise: passing the oil-in-water emulsion through a hydrocyclone.

Preferably, at least 80% by weight of the coal fines of the produced water are in the second fluid. More preferably, at least 90% by weight of the coal fines of the produced water are in the second fluid.

Further, with separation based on flotation, the risk of overtreatment by the oil-soluble phosphate ester and water-immiscible solvent is reduced. Most of the phosphate ester and the water-immiscible solvent is separated from the water phase. Thus, any overtreatment of the oil-soluble phosphate, water-immiscible solvent, or other water-insoluble chemical used in the process, though undesirable from a cost perspective, would not remain in the water phase after the step of separation. As used herein, "overtreatment" means using more of a chemical or solvent than the minimum amount required to achieve the desired separation of coal fines.

Crosslinking the Phosphate Esters to Form a Gel

Preferably, the step of mixing further comprises mixing with a crosslinker for the one or more phosphate esters. Mixing with a crosslinker can be during or after the step of mixing the produced water, the one or more oil-soluble phosphate esters, and the water-immiscible solvent.

Preferably, the crosslinker comprises a source of iron having an oxidation state of +3. More preferably, the crosslinker comprises $Fe_2(SO_4)_3 \cdot H_2O$.

Preferably, the crosslinker is mixed in at least a sufficient proportion relative to the one or more phosphate esters to form a gel.

The method can optionally further comprise the step of: after the step of mechanically separating, breaking the gel. For example, if the crosslinker is $Fe_2(SO_4)_3 \cdot H_2O$, the breaker can be selected for being a reducing agents for iron 3+ to 2+. Preferably, the reducing agent is selected from the group consisting of: dodecalbenzylsulphonic acid ("DDBSA"), sodium hypophosphite, stannous chloride, and thiglycolic acid. It is also contemplated that the gel can be broken by an oxidizer that acts on the phosphate group. According to this mechanism, magnesium oxide, for example, can be employed as an oxidizer to break the gel.

The step of crosslinking provides the ability to secondarily gel the phosphate esters to help carry and separate the coal fines from the produced water. If desired, the gelled material can later be broken to help release the coal fines from the gel.

Step of using the Water from the Produced Water in a Well

Preferably, the step of mixing is performed at the well site from which the produced water is obtained.

Preferably, the method further comprises the step of: after the step of separating, introducing a well fluid comprising the first fluid into a well. More preferably, the step of introducing is into the same well from which the produced water was obtained.

Laboratory Examples

As a control, a sample of produced water containing coal fines was agitated and then observed on standing over time. At time 0, the sample had a consistent black color throughout and 0% settled coal fines; at time 30 minutes, the sample was observed to have lightened in color, a black ring of particles remained at sample's surface, and about 40 to about 50% by weight had settled to the bottom; and after 60 minutes of standing, the sample was observed to still have a black ring of particles at the surface, visible layer of sediment at bottom of jar wherein about 80% to about 90% by weight of the coal fines had settled. A problem is that such a settling time is much too long. In addition, while a quick separation of about 80% of the coal fines from the produced water would be acceptable, a separation of greater than about 90% would be more desirable.

In addition, a control of mixing a sample of produced water having coal fines with 5% Drakeol® white mineral oil did not flocculate coal fines to the surface.

General Laboratory Procedure 100 mL samples of coal water from the Mannville formation were added to glass jars and shaken with concentrations of various chemicals to determine the best possible treatment option.

Once an option for treating the water was found, minimal coal water treatment concentrations were found through titrations.

Over treatment of the sample was studied by adding in up to 3 times the minimum concentration.

All samples were tested for the results with the addition of $Fe_2(SO_4)_3.H_2O$ in an effort to gel the coal. The best result for gellation was produced with a coal water sample that was over-treated.

Successful Results

MO-85M™ added in combination with a hydrocarbon carrier fluid (xylene) to a sample of produced water having a coal fine suspension. At 5 l/m³ of MO-85M™ and 50 l/m³ of Xylene, it was found that the majority of the coal would separate from the water phase and float to the upper xylene phase of the solution. If desired, 0.5 kg/m³ of $Fe_2(SO_4)_3.H_2O$ can be added, which serves as a crosslinker to create a gelation of the MO-85M™ with the coal and xylene. This yielded 100% of the coal into the surface gel layer with cloudy white water layer below.

From this testing, the minimum required treatment of the Mannville coal water sample to achieve a coal layer on the surface was 30 l/m³ of a pre-mixed sample of 30:1 xylene to MO-85M™ satisfactorily separate the majority of the coal from the Mannville sample of produced water having coal fines. In other words, about 29 l/m3 of xylene and about 1 l/m3 of MO-85M™. It is believed this may vary somewhat depending on the amount of coal fines in the produced water.

The aqueous layer from separated oil-in-water emulsion can be mixed again with the coal water sample, yielding no separation. This shows the ability of this treated water to be re-used. Then on addition of the MO-85M™ xylene, coal fines separate into the oil phase.

To make the system more cost-effective, a second set of testing was conducted to optimize the system, and reduce the concentrations required to achieve coal fines flocculation. In this optimized system, MO-85M™ added in combination with a hydrocarbon carrier fluid as above (in this case Drakeol® white mineral oil in combination with heavy reformate) to a produced water having a coal fine suspension. The 1:1:8 ratio by volume of MO-85M™: heavy reformate : Drakeol® white mineral oil was added at a concentration of 5 l/m³ to the produced water. With mixing by agitation, the coal fines floated to the top of the produced water. At this concentration, the coal fines begin to flocculate out of the denser water phase and enter the top hydrocarbon phase of the system immediately. Using a 100 mL sample, visible coal flocculation occurred in under 1 minute. At increased concentrations of the MO-85M™, it worked at an increased rate and did not display any adverse effects upon over treating.

To allow for easier removal of the coal fines, an aqueous solution of $Fe_2(SO_4)_3.H_2O$ or as a dry add can be added to the MO-85M™, solvent and produced water. With further agitation, the coal fines and MO-85M™: hydrocarbon mixture will be gelled/crosslinked by the $Fe_2(SO_4)_3.H_2O$ making the removal of the coal fines from the produced water easier.

This gelled fluid can then be broken with a chemical breaker for the gel such as dodecalbenzylsulphonic acid ("DDBSA").

Laboratory Conclusions

According to invention, a test sample after standing one minute or less, at least 80% flocculation and floatation of coal fines was achieved. With higher proportion of the oil-soluble phosphate esters or the water-immiscible solvent, greater than 90% flocculation and floatation of the coal fines in the produced water sample can be achieved.

Over treatment does not lead to any adverse effects. In addition, the oil-soluble phosphate esters can be gelled with the addition of $Fe_2(SO_4)_3.H_2O$.

The treated water can be recycled and mixed again with fresh coal water, yielding no separation until it is treated once again.

The above described materials can be produced at a low-cost, and can be combined together to make one product for treating produced water having coal fines, with the exception of any desired crosslinker (e.g., $Fe_2(SO_4)_3.H_2O$). This will allow for easy metering of the fluid to fit varying field conditions. Field testing can also be done very easily with this product to ensure that the proper concentration can be added. Over-treatment has not shown adverse effects in lab testing, and has shown to increase the effectiveness of this product.

Comparison to Other Screen Surfactants

All other surfactants screened did not yield satisfactory results. Some of the tested surfactants dropped the coal fines to the bottom of the solution; however, a preferred objective of the invention was to be able to float the coal fines on the top of the produced water for removal.

Conclusions

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of flocculating coal fines from produced water, the method comprising the steps of:
   (A) mixing at least:
      (i) produced water, wherein the produced water comprises suspended coal fines;
      (ii) one or more oil-soluble phosphate esters; and
      (iii) water-immiscible solvent;
   in proportions to obtain an oil-in-water emulsion;
   (B) allowing or mechanically causing the oil-in-water emulsion to substantially break into:
      (i) a first fluid having a continuous phase comprising the water from the produced water; and
      (ii) a second fluid having a continuous phase comprising the water-immiscible solvent; and (C) mechanically separating the first fluid and the second fluid.

2. The method according to claim 1, wherein the oil-in-water emulsion comprises:
(i) the produced water;
(ii) the phosphate esters in a proportion of at least 0.1 l/m$^3$ of the produced water; and
(iii) the water-immiscible solvent:
(a) in a proportion of at least 1 l/m$^3$ of the produced water; and
(b) in a proportion of at least 3:1 by volume of the oil-soluble phosphate esters.

3. The method according to claim 1, wherein the produced water comprises at least 10 g/m$^3$ suspended coal fines.

4. The method according to claim 1, wherein a solvent-washed, dried sample of the total suspended solids in the produced water has a specific gravity of less than 2.

5. The method according to claim 1, wherein the one or more oil-soluble phosphate esters are in a proportion of at least 0.1 l/m$^3$ of the produced water.

6. The method according to claim 1, wherein the one or more oil-soluble phosphate esters are in a proportion in the range of about 0.5 l/m$^3$ to about 10 l/m$^3$ of the produced water.

7. The method according to claim 1, wherein the water-immiscible solvent is greater than 1 l/m$^3$ of the produced water.

8. The method according to claim 1, wherein the water-immiscible solvent is in the range of about 3 l/m$^3$ to about 10 l/m$^3$ of the produced water.

9. The method according to claim 1, wherein the water-immiscible solvent is a proportion in the range of about 5 to 1 to about 50 to 1 of the oil-soluble phosphate esters.

10. The method according to claim 1, wherein the proportions of the produced water, the one or more oil-soluble phosphate esters, and the water-immiscible solvent produce an oil-in-water emulsion that is unstable to the extent of substantially separating in less than 5 minutes after the step of mixing upon standing at 77° F. and 1 atmosphere pressure.

11. The method according to claim 1, wherein the step of allowing or causing to break comprises: allowing the oil-in-water emulsion to stand for less than 5 minutes before the step of mechanically separating.

12. The method according to claim 1, wherein the step of mechanically separating comprises: skimming the second fluid from the top of the first fluid.

13. The method according to claim 1, wherein at least 80% by weight of the coal fines of the produced water are in the second fluid.

14. The method according to claim 1, wherein the step of mixing is performed at the well site from which the produced water is obtained.

15. The method according to claim 1, further comprising the step of:
after the step of separating, introducing a well fluid comprising the first fluid into a well.

16. The method according to claim 15, wherein the step of introducing is into the same well from which the produced water was obtained.

17. A method of flocculating coal fines from produced water, the method comprising the steps of:
(A) mixing at least:
(i) produced water, wherein the produced water comprises suspended coal fines;
(ii) one or more oil-soluble phosphate esters;
(iii) water-immiscible solvent; and
(iv) a crosslinker for the one or more phosphate esters,
in proportions to obtain an oil-in-water emulsion;
(B) allowing or mechanically causing the oil-in-water emulsion to substantially break into:
(i) a first fluid having a continuous phase comprising the water from the produced water; and
(ii) a second fluid having a continuous phase comprising the water-immiscible solvent; and
(C) mechanically separating the first fluid and the second fluid.

18. The method according to claim 17, wherein the crosslinker is mixed in at least a sufficient proportion relative to the one or more phosphate esters to form a gel.

19. The method according to claim 18, further comprising the step of:
after the step of mechanically separating, breaking the gel.

20. The method according to claim 19, wherein the step of breaking the gel is with a reducing agent for the crosslinker.

* * * * *